Patented Jan. 28, 1936

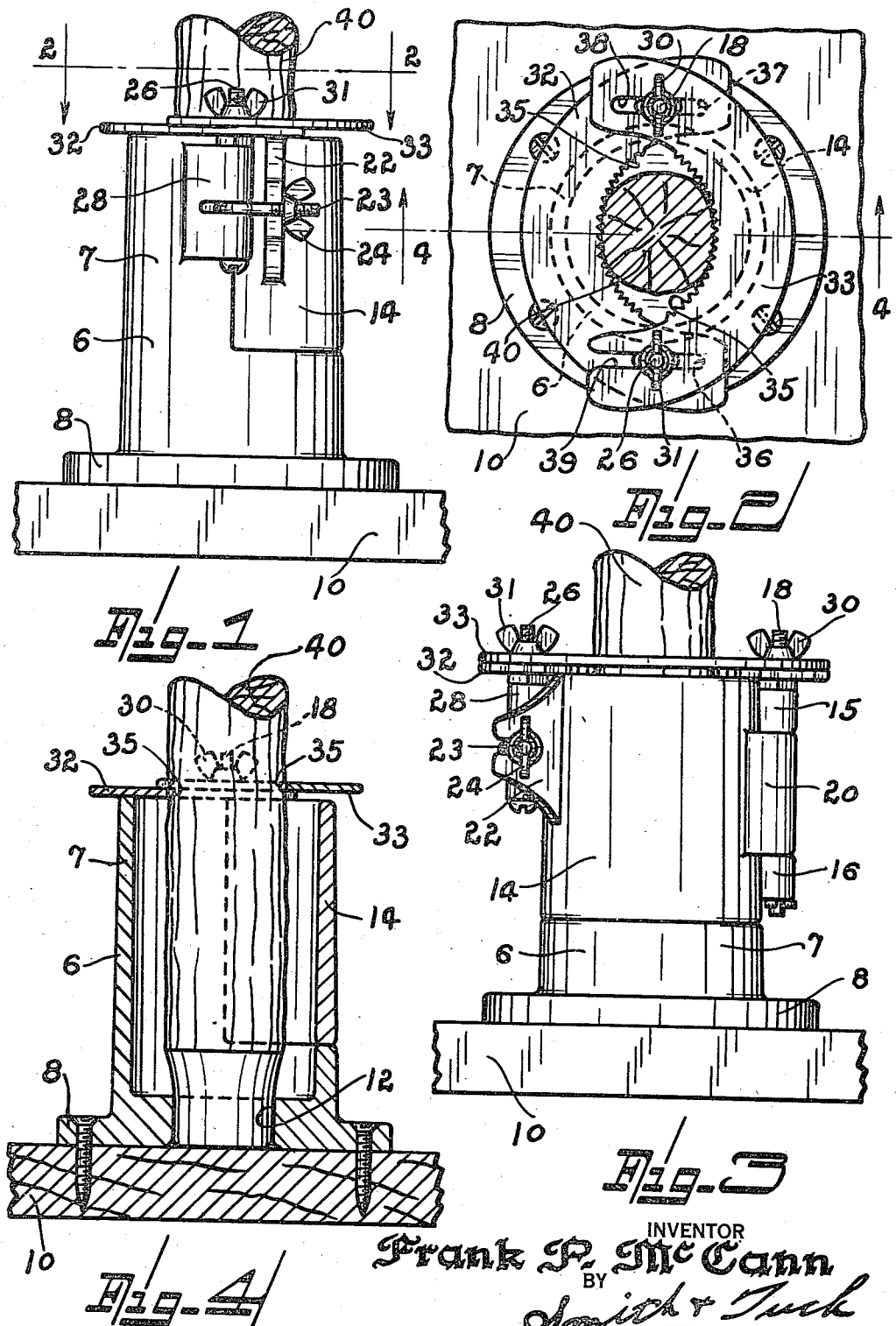

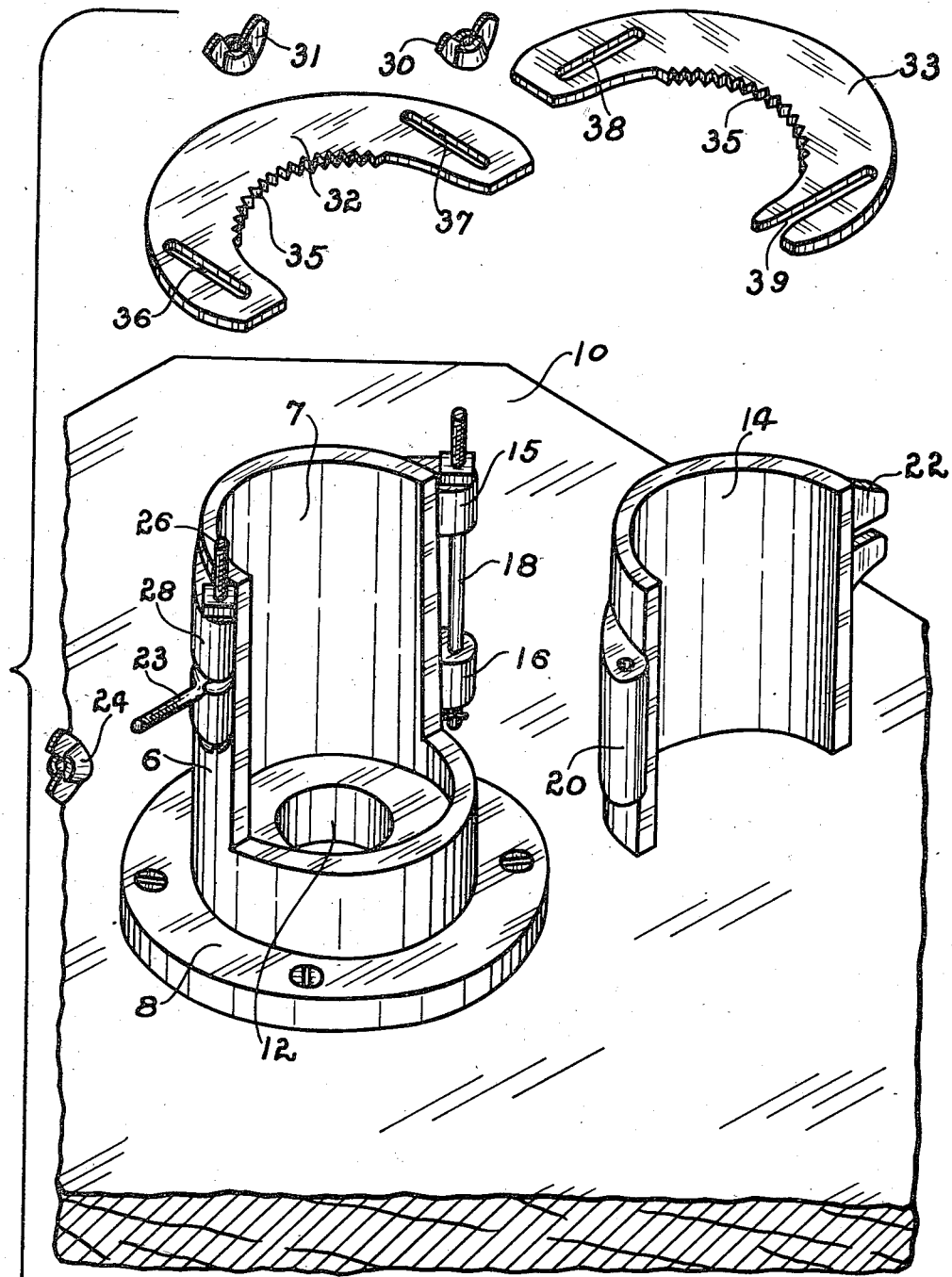

2,029,281

UNITED STATES PATENT OFFICE 2,029,281

TREE HOLDER

Frank P. McCann, Seattle, Wash.

Application November 30, 1934, Serial No. 755,471

3 Claims. (Cl. 248—44)

My present invention relates to that class of devices intended for the purpose of keeping, in an upright position flags, staffs, trees and other decorative material. Its greatest use is probably that of a tree holder.

My present device is intended for mounting on a horizontal surface and to so securely grip a vertical pole or tree as to hold it in the position desired. It may be used to hold flags in windy weather, particularly, and lends itself particularly well to supporting, and holding in position Christmas trees, also tent poles, when used on hard surfaces. Quite a number of tree holders have been created but it is the purpose of my present invention to provide a secure anchoring means which can be readily adjusted to suit trees of varying sizes and, when fully secured, will hold the tree in an upright position with certainty. Another object of my present invention is to provide means which will enable even an inexperienced person to secure a tree in the desired position, and after the period of use, will permit the removal of the tree with the minimum effort.

Other and more specific objects will be apparent from the following description taken in connection with the accompanying drawings, wherein Figure 1 is a side elevation of my device as it would appear when supporting a tree and secured to a sub-base.

Figure 2 is a cross-sectional view along the line 2—2 of Figure 1.

Figure 3 is a front elevation of my device.

Figure 4 is a vertical sectional view taken along the line 4—4 of Figure 2.

Figure 5 is a bracketed, exploded view showing the various parts forming my tree support.

Referring to the drawings, throughout which like reference characters indicate like parts, 6 designates the main body of my device. This I normally prefer to form as a casting so as to easily provide the irregular shape required and to give a secure and substantial foundation for my support. This member is provided with a vertically extending tube portion 7 and a securing flange 8. This flange is intended for easy securing of my device to a sub-foundation 10, as by screw fastening the same thereto after the showing of Figure 4. The sub-base 10 should be of ample proportions to provide against overturning of the device. The lower portion of body 6 is provided with a tree receiving opening 12 of a size somewhat reduced from the interior bore of tube 7, following generally the proportions shown in Figure 4.

One portion of tube 7 is cut away to provide an opening into which door 14 normally is secured. This door is suitably supported from tube 7 by outstanding lugs 15 and 16 which provide for the pivot pin 18, which also passes through lug 20 formed as part of door 14. The opposite edge of door 14 is provided with an outstanding and bifurcated lug 22 which is adapted to receive the hinged eye-bolt 23 which, in turn, is provided with wing nut 24. Eye-bolt 23 is pivotably supported on pin 26 in the bifurcated outstanding lug 28 formed as an integral part of tube 7. Pins 18 and 26 are provided with wing nut as 30 and 31 and each have, in addition to providing pivots as outlined, a secondary purpose of holding and securing the tree gripping, jaw members 32 and 33. These members are probably best shown in Figures 2 and 5. Both members are provided with a plurality of teeth as 35 on their inner surface and, as a matter of convenience, are arcuate in shape. Member 32 is provided with parallel slots 36 ad 37 which are arranged after the showing of Figures 2 and 5, so that the jaw may be moved toward or away from the tree. Jaw 33 is provided with similar slots as 38 and 39 excepting that slot 39 is, preferably open ended. With the open end of slot 39 it is possible to pivot jaw member 33 about pivot pin 18. This is a great convenience in placing the tree in the holder and removing the same.

Method of operation

The first operation is to trim down the end of the tree 40 after the showing of Figure 4 until the end of the tree will fit securely into opening 12. The tree should then be trued up so that it stands in the desired position and, while it is held in that position, jaws 32 and 33 should be pressed firmly against the opposite sides of the tree and the securing wing nuts 30 and 31 tightened. Due to the length of slots 36, 37, 38 and 39 it does not necessarily follow that the tree need be in the center of tube 7. This is a very desirable characteristic of my present device, in that it permits my device to hold in the desired position a tree which may not be true or straight at its base.

When it is desired to remove the tree, wing nuts 30 and 31 are loosened so that the jaw members can be swung away from the tree. Jaw member 33 should preferably be pivoted about pin 18 until it is entirely clear. If the tree has been pressed into opening 12 with considerable force, it may be difficult after the tree has set for some time to lift it from the holder. In such cases it is best to swing jaw 33 out of the way, then to release wing nut 24 so that door 14 may be opened. This enables one to pull the tree over towards the opening and thus free it very easily from the holder. This is a matter of great convenience.

The foregoing description and the accompanying drawings are believed to clearly disclose a preferred embodiment of my invention but it will be understood that this disclosure is merely illustrative and that such changes in the invention may be made as are fairly within the scope and spirit of the following claims:

1. The combination with a tubular tree-holder having a reduced bottom-socket to receive the end of a tree, and a pair of spaced upright bolts projecting above its upper edge, of a pair of opposed, arcuate, slotted-jaws mounted on said bolts, one of said jaws having an open-end slot and adapted to form a pivot at its other slotted end, and nuts on said bolts for clamping the jaws in engagement with a tree.

2. The combination with a tree-holder having an openable side-gate, a hinge bolt for the gate, and a fastening bolt for the free edge of the gate, of a pair of adjustable, opposed, jaws mounted on said bolts, one of said jaws being adapted to pivot on one of the bolts, and nuts on the bolts for clamping the jaws in engagement with a tree.

3. The combination with a tree holder having a side-gate, a hinge bolt for the gate, and a fastening bolt for the free edge of the gate, of a pair of adjustable, opposed, arcuate, slotted jaws mounted on said bolts, one of said jaws having an open slot at one end and adapted to pivot at its other end on a bolt, and nuts on the bolts for clamping the jaws in engagement with a tree.

FRANK P. McCANN.